United States Patent
Fröberg Olsson et al.

(10) Patent No.: US 10,880,053 B2
(45) Date of Patent: Dec. 29, 2020

(54) WIRELESS DEVICE, A NETWORK NODE AND METHODS THEREIN FOR HANDLING TRANSMISSIONS IN A WIRELESS COMMUNICATIONS NETWORK

(71) Applicant: Telefonaktiebolaget LM Ericsson (publ), Stockholm (SE)

(72) Inventors: Jonas Fröberg Olsson, Ljungsbro (SE); Martin Hessler, Linköping (SE); Simon Sörman, Jönköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 159 days.

(21) Appl. No.: 15/746,086

(22) PCT Filed: Dec. 8, 2017

(86) PCT No.: PCT/SE2017/051234
§ 371 (c)(1),
(2) Date: Jan. 19, 2018

(87) PCT Pub. No.: WO2018/128569
PCT Pub. Date: Jul. 12, 2018

(65) Prior Publication Data
US 2019/0386789 A1    Dec. 19, 2019

Related U.S. Application Data

(60) Provisional application No. 62/443,987, filed on Jan. 9, 2017.

(51) Int. Cl.
*H04L 1/18* (2006.01)
*H04L 5/00* (2006.01)
*H04W 72/12* (2009.01)

(52) U.S. Cl.
CPC .......... *H04L 1/1887* (2013.01); *H04L 1/1812* (2013.01); *H04L 1/1893* (2013.01);
(Continued)

(58) Field of Classification Search
CPC ... H04L 1/1887; H04L 1/1893; H04L 1/1812; H04L 5/0053; H04L 5/001; H04W 72/1289
See application file for complete search history.

(56) References Cited

U.S. PATENT DOCUMENTS

| | | | |
|---|---|---|---|
| 2015/0117240 A1* | 4/2015 | Liang | H04L 1/0025 370/252 |
| 2015/0271818 A1* | 9/2015 | Tavildar | H04W 52/0216 375/138 |

(Continued)

OTHER PUBLICATIONS

Unknown, Author, "DL Processing Time Consideration", 3GPP TSG-RAN WG1 #87, R1-1612077, Qualcomm Incorporated, Reno, Nevada, USA, Nov. 14-18, 2016, pp. 1-9.
(Continued)

*Primary Examiner* — Andrew Lai
*Assistant Examiner* — Harry H Kim
(74) *Attorney, Agent, or Firm* — Murphy, Bilak & Homiller, PLLC

(57) ABSTRACT

Embodiments herein relate to a method performed by a wireless device for handling transmissions in a wireless communications network, wherein a first transmission is communicated to or from the wireless device in a first subframe (n) from or to a network node in the wireless communications network. The wireless device obtains information indicating that a re-transmission of the first transmission is expected in a second subframe (n+1) consecutive to the first subframe (n). Also, the wireless device determines a search space in the second subframe (n+1) based on the obtained information. Further, wireless device receives a
(Continued)

transmission assignment for a retransmission of the first transmission in the second subframe (n+1) based on the determined search space. Embodiments herein also relate to a wireless device, and a network node and a method therein for handling transmissions in a wireless communications network.

20 Claims, 10 Drawing Sheets

(52) U.S. Cl.
CPC ....... *H04L 5/0053* (2013.01); *H04W 72/1289* (2013.01); *H04L 5/001* (2013.01)

(56) References Cited

U.S. PATENT DOCUMENTS

| | | | |
|---|---|---|---|
| 2017/0223674 A1* | 8/2017 | Dinan | H04L 1/1861 |
| 2017/0310438 A1* | 10/2017 | Kim | H04B 7/02 |
| 2018/0184426 A1* | 6/2018 | Li | H04W 72/0446 |
| 2019/0014560 A1* | 1/2019 | Takeda | H04W 72/0446 |
| 2019/0207796 A1* | 7/2019 | Hwang | H04W 72/12 |
| 2019/0254029 A1* | 8/2019 | Li | H04L 1/1861 |
| 2019/0289618 A1* | 9/2019 | Dudda | H04L 1/1657 |

OTHER PUBLICATIONS

Unknown, Author, "Downlink Control Channel Structures", 3GPP TSG RAN WG1 Meeting #87, R1-1611207, Huawei, HiSilicon, Reno, USA, Nov. 14-18, 2016, pp. 1-6.

Unknown, Author, "Scaled Numerology Design for Control Channels Overview", 3GPP TSG-RAN WG1 #87, R1-1612019, Qualcomm Incorporated, Reno, USA, Nov. 14-18, 2016, pp. 1-10.

* cited by examiner

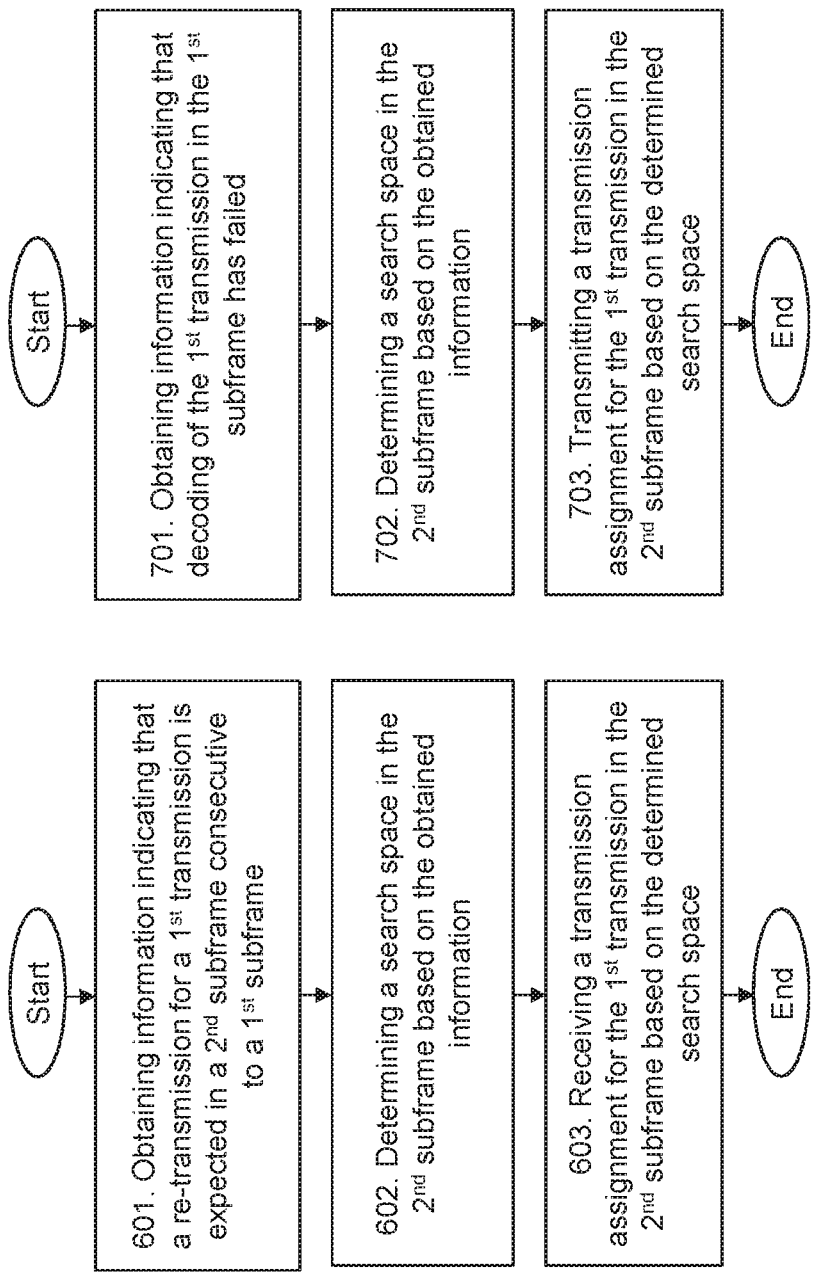

US 10,880,053 B2

WIRELESS DEVICE, A NETWORK NODE AND METHODS THEREIN FOR HANDLING TRANSMISSIONS IN A WIRELESS COMMUNICATIONS NETWORK

TECHNICAL FIELD

Embodiments herein relate to handling transmissions in a wireless communications network. In particular, embodiments herein relate to a wireless device and a method therein for handling transmissions in a wireless communications network. Embodiments herein also relate to a network node and method therein for handling transmissions in a wireless communication network.

BACKGROUND

In today's wireless communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network comprises radio base stations providing radio coverage over at least one respective geographical area forming a cell. The cell definition may also incorporate frequency bands used for transmissions, which means that two different cells may cover the same geographical area but using different frequency bands. Wireless devices, also referred to herein as User Equipment, UEs, mobile stations, and/or wireless terminals, are served in the cells by the respective radio base station and are communicating with respective radio base station. The wireless devices transmit data over an air or radio interface to the radio base stations in uplink (UL) transmissions and the radio base stations transmit data over an air or radio interface to the wireless devices in downlink (DL) transmissions.

Long Term Evolution (LTE) is a project within the 3rd Generation Partnership Project (3GPP) to evolve the WCDMA standard towards the fourth generation (4G) of mobile telecommunication networks. In comparisons with third generation (3G) WCDMA, LTE provides increased capacity, much higher data peak rates and significantly improved latency numbers. For example, the LTE specifications support downlink data peak rates up to 300 Mbps, uplink data peak rates of up to 75 Mbit/s and radio access network round-trip times of less than 10 ms. In addition, LTE supports scalable carrier bandwidths from 20 MHz down to 1.4 MHz and supports both Frequency Division Duplex (FDD) and Time Division Duplex (TDD) operation.

LTE is a Frequency Division Multiplexing technology wherein Orthogonal Frequency Division Multiplexing (OFDM) is used in a DL transmission from a radio base station to a wireless device. Single Carrier-Frequency Domain Multiple Access (SC-FDMA) is used in an UL transmission from the wireless device to the radio base station. Services in LTE are supported in the packet switched domain. The SC-FDMA used in the UL is also referred to as Discrete Fourier Transform Spread (DFTS)-OFDM.

The basic LTE downlink physical resource may thus be seen as a time-frequency grid as illustrated in FIG. 1, where each Resource Element (RE) corresponds to one OFDM subcarrier during one OFDM symbol interval. A symbol interval comprises a cyclic prefix (cp), which cp is a prefixing of a symbol with a repetition of the end of the symbol to act as a guard band between symbols and/or facilitate frequency domain processing. Frequencies f or subcarriers having a subcarrier spacing $\Delta f$ are defined along a z-axis and symbols are defined along an x-axis.

In the time domain, LTE downlink transmissions are organized into radio frames of 10 ms, each radio frame comprising ten equally-sized subframes, #0-#9, each with a $T_{subframe}=1$ ms of length in time as shown in FIG. 2. Furthermore, the resource allocation in LTE is typically described in terms of resource blocks, where a resource block corresponds to one slot of 0.5 ms in the time domain and 12 subcarriers in the frequency domain. Resource blocks are numbered in the frequency domain, starting with resource block 0 from one end of the system bandwidth.

Downlink and uplink transmissions are dynamically scheduled, i.e. in each subframe the radio base station transmits control information about to or from which wireless devices data is transmitted and upon which resource blocks the data is transmitted. The control information for a given wireless device is transmitted using one or multiple Physical Downlink Control Channels (PDCCH). Control information of a PDCCH is transmitted in the control region comprising the first n=1, 2, 3 or 4 OFDM symbols in each subframe where n is the Control Format Indicator (CFI). Typically, the control region may comprise many PDCCH carrying control information to multiple wireless devices simultaneously. A downlink system with three OFDM symbols allocated for control signaling, for example the PDCCH, is illustrated in FIG. 3. The three OFDM symbols are denoted control region. The resource elements used for control signaling are indicated with wave-formed lines and resource elements used for reference symbols are indicated with diagonal lines. Frequencies f or subcarriers are defined along a z-axis and symbols are defined along an x-axis.

The 3GPP initiative "License Assisted Access" (LAA) intends to allow LTE equipment to also operate in the unlicensed 5 GHz radio spectrum. The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

Regulatory requirements, however, may not permit transmissions in the unlicensed spectrum without prior channel sensing. Since the unlicensed spectrum must be shared with other radios of similar or dissimilar wireless technologies, a so-called listen-before-talk (LBT) method needs to be applied. Sensing of energy within a certain time period and determining if it exceeds a certain energy detection threshold is part of the LBT method. Today, the unlicensed 5 GHz spectrum is mainly used by equipment implementing the IEEE 802.11 Wireless Local Area Network (WLAN) standard. This standard is known under its marketing brand "Wi-Fi."

From LTE Rel-11 onwards, the above described resource assignments can also be scheduled on the enhanced PDCCH (ePDCCH). For Rel-8 to Rel-10 only PDCCH is available. The reference symbols shown in the above FIG. 1 are the cell specific reference symbols (CRS) and are used to support multiple functions including fine time and frequency synchronization and channel estimation for certain transmission modes.

Physical Downlink Control Channel (PDCCH) and Enhanced PDCCH (ePDCCH)

The PDCCH/ePDCCH is used to carry downlink control information (DCI) such as scheduling decisions and power-control commands. More specifically, the DCI includes:

- Downlink scheduling assignments, including PDSCH resource indication, transport format, Hybrid-Automatic Repeat-reQuest (HARQ) information, and control information related to spatial multiplexing (if applicable). A downlink scheduling assignment also includes a command for power control of the Physical Uplink Control Channel (PUCCH) used for transmission of HARQ acknowledgements in response to downlink scheduling assignments.
- Uplink scheduling grants, including Physical Uplink Shared Channel (PUSCH) resource indication, transport format, and HARQ-related information. An uplink scheduling grant also includes a command for power control of the PUSCH.
- Power-control commands for a set of terminals as a complement to the commands included in the scheduling assignments/grants.

One PDCCH/ePDCCH carries one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message is transmitted on separate PDCCH/ePDCCH resources, and consequently there are typically multiple simultaneous PDCCH/ePDCCH transmissions within each subframe in each cell. Furthermore, to support different radio-channel conditions, link adaptation can be used, where the code rate of the PDCCH/ePDCCH is selected by adapting the resource usage for the PDCCH/ePDCCH, to match the radio-channel conditions.

SUMMARY

An object of the invention is to improve the handling of transmissions in a wireless communications network.

According to a first aspect of embodiments herein, the object is achieved by a method performed by a wireless device for handling transmissions in a wireless communications network, wherein a first transmission is communicated to or from the wireless device in a first subframe from or to a network node in the wireless communications network. The wireless device obtains information indicating that a re-transmission of the first transmission is expected in a second subframe consecutive to the first subframe. Also, the wireless device determines a search space in the second subframe based on the obtained information. Further, wireless device receives a transmission assignment for a retransmission of the first transmission in the second subframe based on the determined search space.

According to a second aspect of embodiments herein, the object is achieved by a wireless device for handling transmissions in a wireless communications network, wherein a first transmission is communicated to or from the wireless device in a first subframe from or to a network node in the wireless communications network. The wireless device is configured to obtain information indicating that a re-transmission of the first transmission is expected in a second subframe consecutive to the first subframe. The wireless device is also configured to determine a search space in the second subframe based on the obtained information. The wireless device is further configured to receive a transmission assignment for a retransmission of the first transmission in the second subframe based on the determined search space.

According to a third aspect of embodiments herein, the object is achieved by a method performed by a network node for handling transmissions in a wireless communications network, wherein a first transmission is communicated to or from a wireless device in a first subframe from or to the network node. The network node obtains information indicating that decoding of the first transmission in the first subframe has failed. The network node also determines a search space in a second subframe consecutive to the first subframe based on the obtained information. Further, the network node transmits, to the wireless device, a transmission assignment for a retransmission of the first transmission in the second subframe based on the determined search space.

According to a fourth aspect of embodiments herein, the object is achieved by a network node for handling transmissions in a wireless communications network, wherein a first transmission is communicated to or from a wireless device in a first subframe from or to the network node. The network node is configured to obtain information indicating that decoding of the first transmission in the first subframe has failed. The network node is also configured to determine a search space in a second subframe consecutive to the first subframe based on the obtained information. The network node is further configured to transmit, to the wireless device, a transmission assignment for a retransmission of the first transmission in the second subframe based on the determined search space.

According to a fifth aspect of the embodiments herein, computer programs are also provided configured to perform the methods described above. Further, according to a sixth aspect of the embodiments herein, carriers are also provided configured to carry the computer programs configured for performing the methods described above.

Further possible features and benefits of this solution will become apparent from the detailed description below.

BRIEF DESCRIPTION OF THE DRAWINGS

Embodiments will now be described in more detail in relation to the enclosed drawings.

FIG. 6 is a flowchart depicting embodiments of a method in a wireless device, FIG. 7 is a flowchart depicting embodiments of a method in a network node.

DETAILED DESCRIPTION

Figure 1:
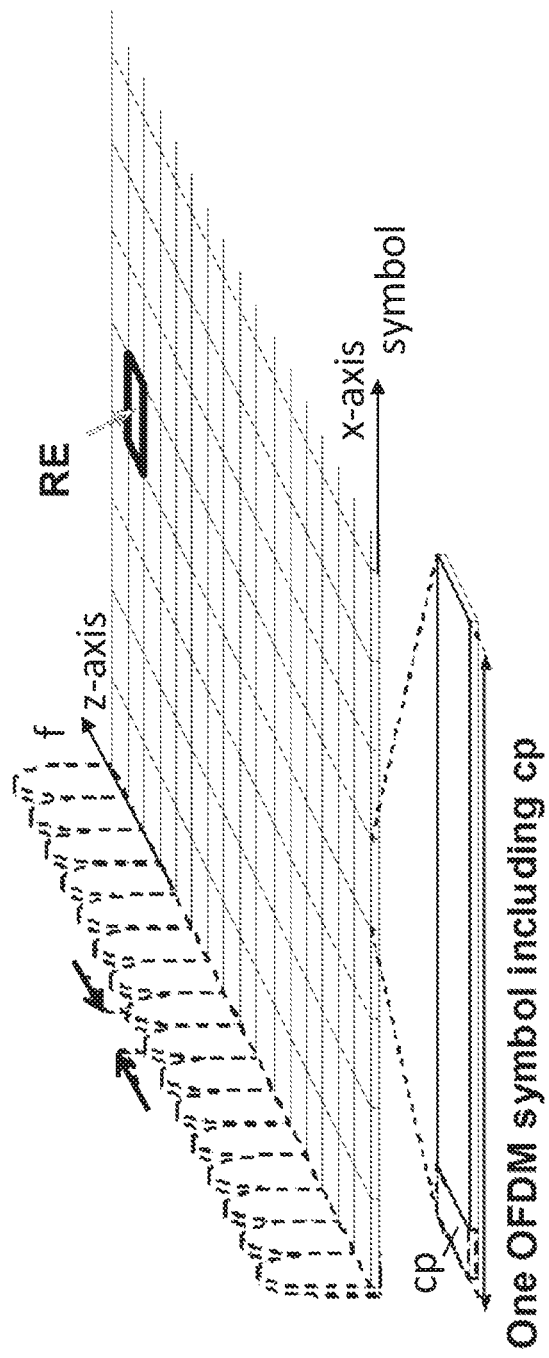
FIG. 1 is a schematic block diagram of a LTE downlink physical resource.
Figure 2:
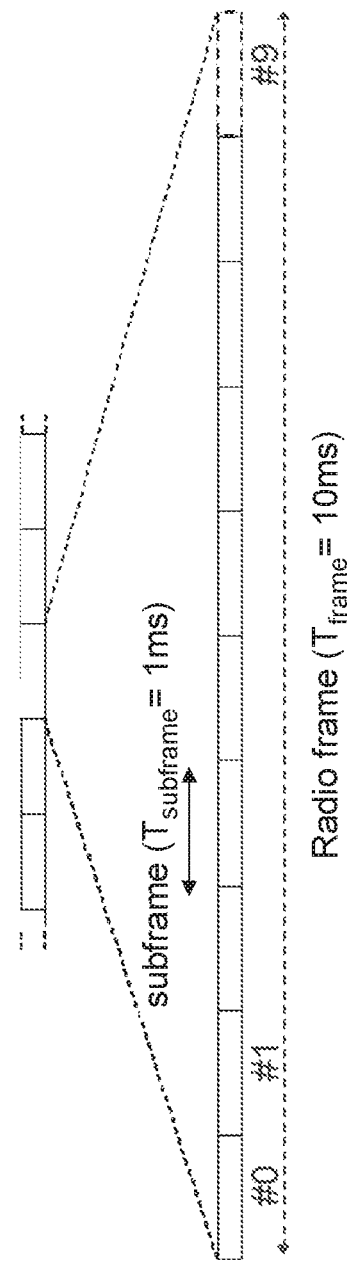
FIG. 2 is a schematic overview depicting radio frames.
Figure 3:
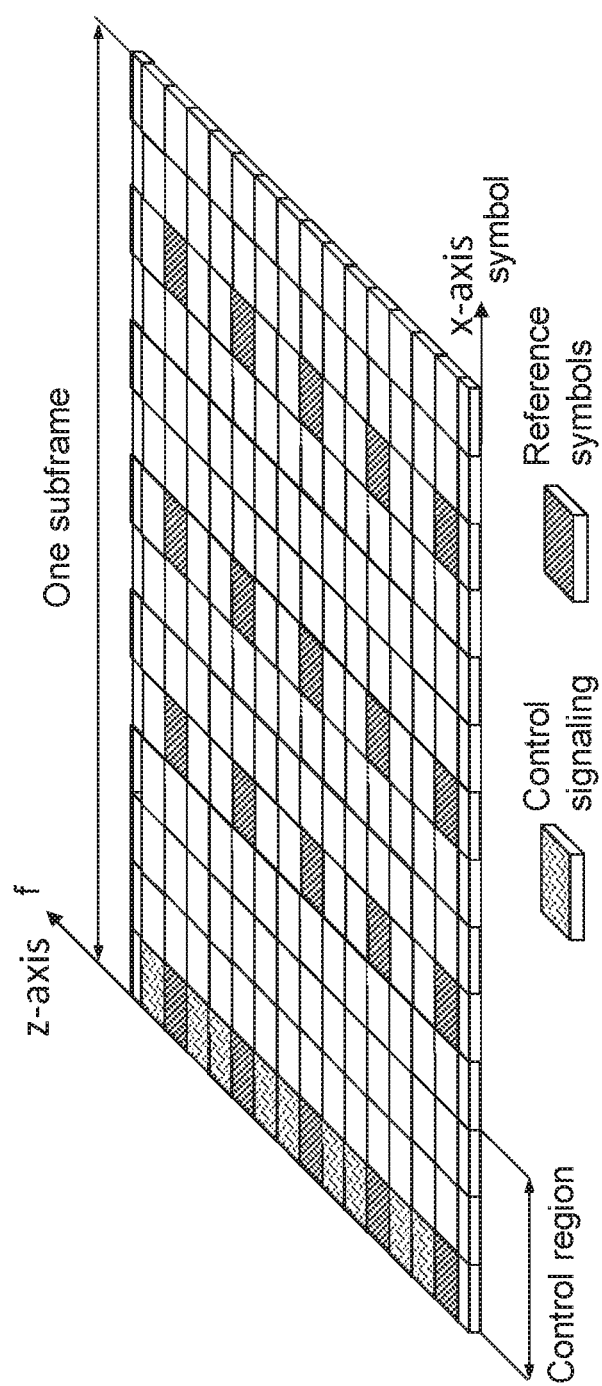
FIG. 3 is a schematic overview depicting a DL subframe.

The figures herein are schematic and simplified for clarity, and they merely show details which are essential to the understanding of the embodiments presented herein, while other details have been left out. Throughout, the same reference numerals are used for identical or corresponding parts or steps.

Figure 4:
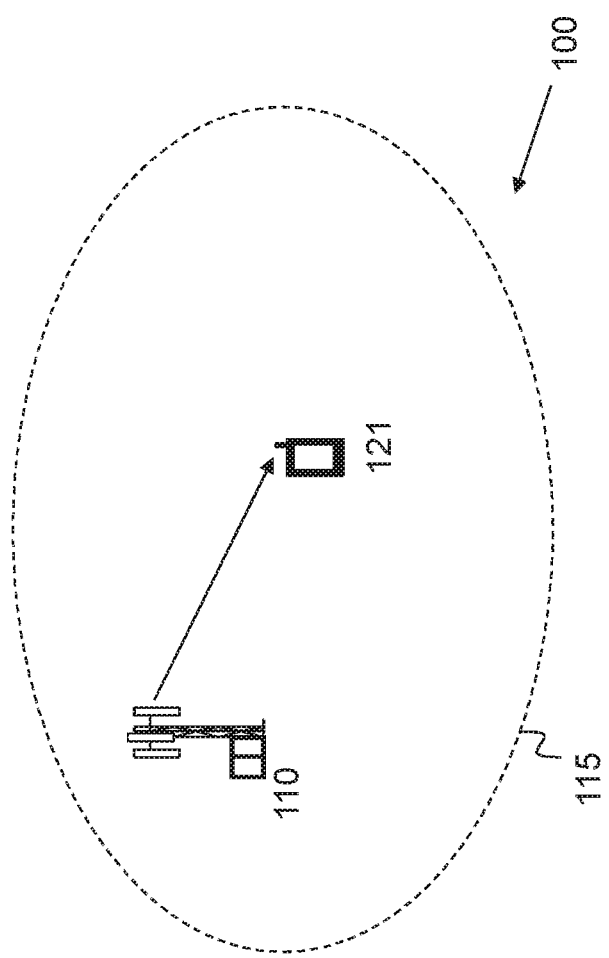
FIG. 4 is a schematic block diagram illustrating embodiments of communication nodes in a wireless communications network.

FIG. 4 depicts a wireless communications network 100 in which embodiments herein may operate. In some embodiments, the wireless communications network 100 may be a radio communications network such as a Long Term Evolution (LTE) network.

Although, the wireless communications network 100 is exemplified herein as an LTE network, the wireless communications network 100 may also employ technology of any one of 5G/NR, LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM, or any other similar network or system. The wireless communications network 100 may also be an Ultra Dense Network, UDN, which e.g. may transmit on millimetre-waves (mmW).

The wireless communications network 100 comprises a network node 110. The network node 110 serves at least one coverage area 115. The coverage area 115 may in some cases also be referred to as a cell. The network node 110 may correspond to any type of radio network node or any network node, which communicates with a wireless communication device and/or with another network node, such as, e.g. a gNB in a 5G/NR network. Other examples of the network node 110 may comprise, e.g. a base station, a radio base station, eNB, eNodeB, a Home Node B, a Home eNode B, femto Base Station (BS), pico BS, etc. Further examples of the network node 110 may also be e.g. a repeater, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), core network node (e.g. MSC, MME, etc.), O&M, OSS, SON, positioning node (e.g. E-SMLC), MDT, etc. Another example of the network node 110 may be a wireless device.

In FIG. 4, a wireless device 121 is located within the coverage area 115. The wireless device 121 is configured to communicate within the wireless communications network 100 via the network node 110 over a radio link served by the network node 110. The wireless device 121 may refer to any type of communication device or user equipment (UE) communicating with a network node and/or with another communication device in a cellular, mobile or radio communication network or system. Examples of such a wireless communication device are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication, etc.

It should be noted that within the context of the present application, the term "wireless communication network", or short "network", may particularly denote a collection of nodes or entities, related transport links, and associated management needed for running a service. The service may, for example, be a wireless telephony service or packet transport service. Depending on the service, different node types or entities may be utilized to realize the service. Typical examples of a wireless communication network are radio access network such as 2G/GSM, 3GWCDMA, CDMA, LTE, 5G/NR, etc.

Furthermore, although embodiments below are described with reference to FIG. 5, this should not be construed as limiting to the embodiments herein, but merely as an example made for illustrative purposes.

As part of the developing of the embodiments described herein, a problem will first be identified and discussed.

For example, in an LTE wireless communication network, a PDCCH and evolved or enhanced PDCCH, ePDCCH, are used to transmit downlink and uplink assignments/grants. The PDCCH was introduced in the very first release of LTE while ePDCCH was introduced later in Rel-11. The size of PDCCH region, i.e. where a PDCCH may be located, is adaptive in time domain, typically covering 1-3 first OFDM symbols, where the size used is signaled to wireless devices using the Physical Control Format Indicator Channel, PCFICH. In the frequency domain, the PDCCH is static covering the whole frequency band. The ePDCCH is also dynamic in time-domain wherein the starting OFDM is the OFDM symbol following the last OFDM symbol of the PDCCH. In frequency domain, the ePDCCH is semi-static, where a wireless device may be configured with up to two ePDCCH regions. Two ePDCCH regions may also referred to as a set of ePDCCH regions. Each of the ePDCCH-sets cover a set of physical resource blocks, PRBs, not necessarily of equal size.

A search space is a set of different time-frequency locations or transmission resources where a wireless device will attempt to receive a PDCCH or an ePDCCH. There are common and UE-specific search spaces. All wireless devices will attempt to receive a PDCCH or a ePDCCH in the common search spaces, while only specific wireless devices will consider the UE-specific search spaces.

Upon a successful reception of a downlink assignment, the wireless device will perform a reception of a data transmission on the Physical Downlink Shared Channel, PDSCH, according to the received assignment. The wireless device will decode the data and then transmit a Hybrid Automatic Repeat request, HARQ-ACK/NACK indicating whether the data was successfully decoded or not. The HARQ-ACK/NACK will be sent on the Physical Uplink Shared Channel, PUSCH, or Physical Uplink Control Channel, PUCCH. This may depend on if the wireless device additionally sends data or not. In a wireless communication network operating in Frequency Division Duplex, FDD, the HARQ-ACK is transmitted in sub-frame n+4 acknowledging a data transmission in sub-frame n. When the network node receives the HARQ-ACK/NACK, the network node may determine whether it needs to perform a re-transmission or not. There are currently eight HARQ processes in the wireless devices, which allows for a HARQ Round-Trip Time, HARQ-RTT, of eight sub-frames. Depending of processing capability of the network node, the HARQ-RTT may be slightly shortened.

3GPP has started the work on the 5G new radio (NR) technology where reduced latency is one of the key features of 5G. For NR, the PDCCH is expected to be in the first OFDM symbol(s) of a subframe, as in the LTE PDCCH, to allow for early decoding. The PUCCH is proposed to be in the last OFDM symbol of a subframe, which may make it possible to even transmit the HARQ-ACK in the same sub-frame as the data transmission.

Figure 5:
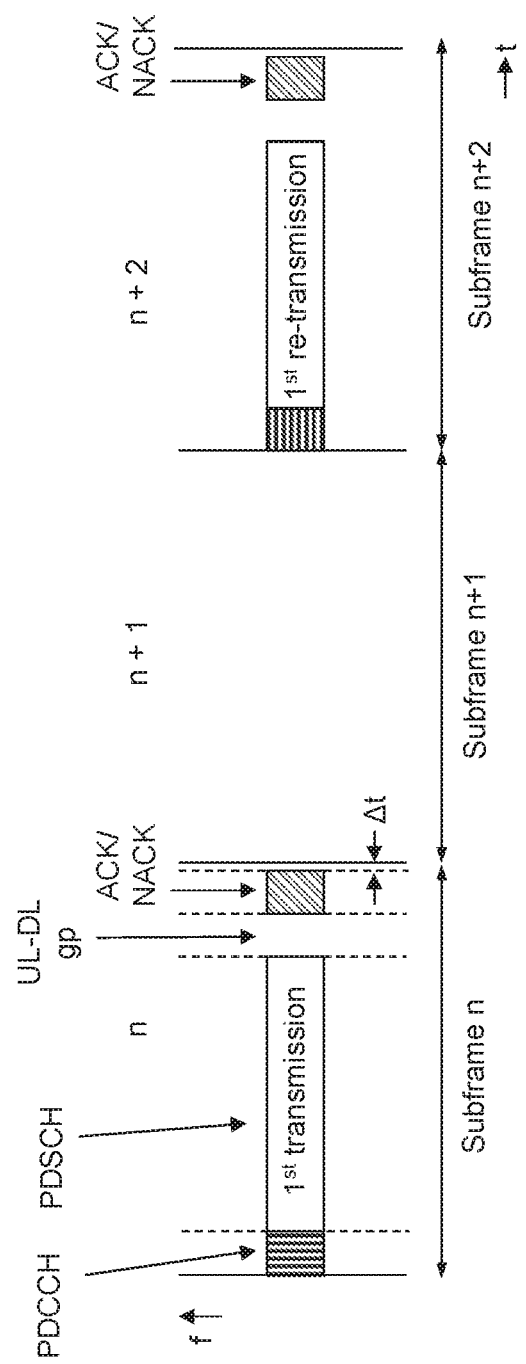
FIG. 5 is a schematic illustration of HARQ-ACK signalling in a TDD system.

FIG. 5 depicts an illustration of an example of a HARQ-ACK in same sub-frame as the first data transmission for a TDD system. Here, the PDCCH occupies the first OFDM symbols and is followed by the data transmission on the PDSCH. A guard time or guard period, gp, for the switch from downlink to uplink, DL-UL gp, may occupy the OFDM symbol before the last OFDM symbol that is here occupied by the PUCCH. This is done in order to be able to make the switch from downlink to uplink, as well as to provide time for decoding the data transmission received on the PDSCH.

Re-transmission of the first data transmission may occur in sub-frame n+2. This is because, with the PUCCH in the last OFDM symbol and the PDCCH in the first OFDM symbols, it will be extremely difficult to achieve a HARQ-RTT of n+1. This is difficult since the network node will likely have less than one OFDM symbol to: decode the HARQ-ACK, perform the scheduling for the next subframe (n+1), and build and encode the data that will be transmitted for the next subframe (n+1). That is, it will be extremely hard for the network node to manage both decoding of the HARQ-ACK received on the PUCCH in the last OFDM symbol and perform scheduling before the next subframe (n+1) during Δt.

Although a HARQ-RTT of n+2 is an improvement compared to, for example, LTE, it may still be too long to permit re-transmission. Some critical-MTC end-to-end latency requirements may be as low as 1 ms, and in some scenarios even as low as 0.5 ms. This end-to-end latency may comprise transport latency, queue waiting time (i.e. packets may not be served by scheduler immediately), etc.

Hence, there is a need for reduced latency for transmission in wireless communications networks. This issue is addressed by embodiments described herein, which are exemplified and explained in more detail below with reference to the FIGS. 6-13. In fact, a further possible object of the embodiments herein is to reduce latency for transmissions in a wireless communications network, for example, for transmissions between a wireless device and a network node.

According to one aspect this issue is addressed by having the wireless device 121 configured to obtain information indicating if a re-transmission is expected or not in the next consecutive subframe. The wireless device 121 may then determine a PDCCH search space for the next consecutive subframe based on the obtained information. In some embodiments, the determined PDCCH search space may encompass or be located in the second OFDM symbol in the next consecutive subframe in case the information indicates that re-transmission is expected, or encompass or be located in the first OFDM symbol, i.e. the regular or default PDCCH search space, otherwise.

It should also be noted that when the term "subframe" is used herein, it may refer to any corresponding Transmit Time Interval, TTI, in the actual wireless communications network, such as, e.g. slots or mini-slots in a wireless communication network implementing New Radio, NR.

Example of embodiments of a method performed by a wireless device 121 for handling transmissions in a wireless communications network 100, wherein a first transmission is communicated to or from the wireless device 121 in a first subframe n from or to a network node 110 in the wireless communications network 100, will now be described with reference to the flowchart depicted in FIG. 6. FIG. 6 illustrates an example of actions or operations which may be taken or performed by the wireless device 121.

Actions 601

The wireless device 121 may obtain information indicating that a re-transmission of the first transmission is expected in a second subframe n+1 consecutive to the first subframe n. In other words, this may also be described as that the wireless device 121 may obtain information indicating that a re-transmission assignment for the first transmission is expected on a physical control channel in a second subframe consecutive to the first subframe.

In some embodiments, the wireless device 121 may obtain the information indicating that a re-transmission of the first transmission is expected by determining that the decoding of the first transmission in the first subframe n failed. In this case, according to some embodiments, the decoding of the first transmission in the first subframe n is determined by the wireless device 121 to have failed in case a Hybrid Automatic Repeat request, HARQ, Non-Acknowledgement message, NACK, for the first transmission is sent by the wireless device 121. Further, in this case, the HARQ-NACK message may be sent by the wireless device 121 in the first subframe n.

According to some embodiments, the wireless device 121 may obtain the information indicating that a re-transmission of the first transmission is expected by determining that the first transmission in the first subframe n is a transmission sent from the wireless device 121.

Action 602

After obtaining the information in Action 601, the wireless device 121 may determine a search space in the second subframe n+1 based on the obtained information. In other words, this may also be described as that the wireless device 121 may, after obtaining the information in Action 601, determine a secondary search space for the physical control channel in the second subframe based on the obtained information. It should be noted that the determined search space in the second subframe n+1 may be different from an existing search space in the second subframe n+1. In some embodiments, the determined and existing search space may be search spaces of a physical control channel, wherein the physical control channel may be a Physical Downlink Control Channel, PDCCH, or an enhanced PDCCH, ePDCCH. It may also be noted here that, according to some embodiments, the determined search space and the existing search space may be defined by a set of PDCCH candidates for different aggregation levels in a CORESET in a 5G/NR wireless communications network. A CORESET is a control resource set made up of multiple resource blocks, i.e. multiples of 12 REs, in the frequency domain and in the range of 1-3 OFDM symbols in the time domain.

Further, in some embodiments, the determined search space is determined by the wireless device 121 to use one or more symbols in the second subframe n+1 that are different from one or more symbols in the second subframe n+1 used by the existing search space. Also, in some embodiments, the existing search space may use at least the first symbol in the second subframe n+1, and the determined search space may use one or more symbols in the second subframe n+1 consecutive and/or subsequent to the at least first symbol in the second subframe n+1 used by the existing search space.

Action 603

After the determination in Action 602, the wireless device 121 may receive a transmission assignment for a retransmission of the first transmission in the second subframe n+1 based on the determined search space. In other words, this may also be described as that the wireless device 121 may, receive a re-transmission assignment for the first transmission in the second subframe based on the determined secondary search space, e.g. within the determined secondary search space.

In some embodiments, the transmission assignment for the retransmission of the first transmission in the second subframe n+1 may comprise less number of bits than the transmission assignment for the first transmission in the first subframe n. In this case, according to some embodiments, the transmission assignment may be a single bit assignment indicating that the transmission assignment for the retransmission of the first transmission in the second subframe n+1 equals the transmission assignment for the first transmission in the first subframe n.

In some embodiments, the transmission assignment for the retransmission of the first transmission in the second subframe n+1 may indicate a transmission resource allocation for the re-transmission of the first transmission in the second subframe n+1 that is larger in the frequency domain than the transmission resource allocation indicated in a transmission assignment for the first transmission in the first subframe n. In some embodiments, the wireless device 121 may further ignore a transmission assignment for a second transmission found in the existing search space in the second subframe n+1 when the transmission assignment for the retransmission of the first transmission is found in the determined search space in the second subframe n+1.

According to some embodiments, the wireless device 121 may further obtain information indicating that a re-transmission of the first transmission is not expected in the second subframe n+1. In some embodiments, the wireless device 121 may obtain the information indicating that a re-transmission is not expected by determining that the decoding of the first transmission in the first subframe n was successful. In this case, the wireless device 121 may determine that the decoding of the first transmission in the first subframe n is successful in case a HARQ Acknowledgement message, ACK, for the first transmission is sent by wireless device 121. In this case, the wireless device 121 may also receive a transmission assignment for a second transmission in the second subframe n+1 based on the existing search space in the second subframe n+1. Also, the wireless device may receive the second transmission in the second subframe n+1 based on the received transmission assignment for the second transmission. Alternatively, the wireless device 121 may transmit the second transmission in a third subframe n+2 consecutive or subsequent to the second subframe n+1 based on the received transmission assignment.

In some embodiments, the wireless device 121 may further receive a re-transmission of the first transmission in the second subframe n+1 based on the received transmission assignment. This may also be referred to as that the wireless device 121 optionally may receive a re-transmission of the first transmission in the second subframe n+1 based on the received re-transmission assignment, e.g. in accordance with the received re-transmission assignment. Alternatively, the wireless device 121 may further transmit a re-transmission of the first transmission in a third subframe n+2 consecutive or subsequent to the second subframe n+1 based on the received transmission assignment. This may also be referred to as that the wireless device 121 alternatively may transmit a re-transmission of the first transmission in a third subframe n+2 consecutive or subsequent to the second subframe n+1 based on the received re-transmission assignment.

Further embodiments of the wireless device 121 are described in more detail below and with reference to FIGS. 8-12.

Example of embodiments of a method performed by a network node 110 for handling transmissions in a wireless communications network 100, wherein a first transmission is communicated to or from the wireless device 121 in a first subframe n from or to the network node 110, will now be described with reference to the flowchart depicted in FIG. 7. FIG. 7 illustrates an example of actions or operations which may be taken by the network node 110.

Actions 701

The network node 110 may obtain information indicating that decoding of the first transmission in the first subframe n has failed.

In some embodiments, the information indicating that the decoding of the first transmission in the first subframe n has failed may be a HARQ NACK message received from the wireless device 121. In this case, the network node 110 may further transmit, to the wireless device 121, a re-transmission of the first transmission in the second subframe n+1 based on the transmitted transmission assignment for the retransmission of the first transmission in the second subframe n+1.

In some embodiments, the information indicating that the decoding of the first transmission in the first subframe n has failed is determined by the network node 110. In this case, the network node 110 may further receive, from the wireless device 121, a re-transmission of the first transmission in a third subframe n+2 consecutive or subsequent to the second subframe n+1 based on the transmitted transmission assignment for the retransmission of the first transmission in the second subframe n+1.

Action 702

After obtaining the information in Action 701, the network node 110 may determine a search space in a second subframe n+1 consecutive to the first subframe n based on the obtained information. In other words, this may also be described as that the network node 110 may, after obtaining the information in Action 701, may determine a secondary search space for the physical control channel in a second subframe n+1 consecutive to the first subframe n based on the obtained information. In some embodiments, the determined search space in the second subframe n+1 may be different from an existing search space in the second subframe n+1.

Action 703

The network node 110 may then transmit, to the wireless device 121, a transmission assignment for a retransmission of the first transmission in the second subframe n+1 based on the determined search space. In other words, this may also be described as that the network node 110 may then transmit, to the wireless device 121, a re-transmission assignment for the first transmission in the second subframe n+1 within the determined secondary search space.

According to some embodiments, the network node 110 may further obtain information indicating a successful decoding of the first transmission in the first subframe n. The network node 110 may then also transmit, to the wireless device 121, a transmission assignment for the second transmission in the second subframe n+1 based on the existing search space. Here, the network node 110 may also transmit the second transmission in the second subframe n+1 based on the transmitted transmission assignment for the second transmission. Alternatively, the network node 110 may here receive the second transmission in a third subframe n+2 consecutive or subsequent to the second subframe n+1 based on the transmitted transmission assignment for the second transmission.

According to some embodiments, the network node 110 may further, in case the transmitting of the transmission assignment for the second transmission is performed prior to obtaining the information indicating that the decoding of the first transmission has failed, skip the transmission of the second transmission in the second subframe n+1. Instead, the network node 110 may perform the determination in Action 702 and the transmission described above in this Action 703. In this case, the network node 110 may also transmit the re-transmission of the first transmission in the second subframe n+1 based on the transmitted transmission assignment for the retransmission of the first transmission in the second subframe n+1.

Further embodiments of the network node 110 are described in more detail below and with reference to FIGS. 8-11 and 13.

In some embodiments, the wireless device 121 may be configured to determine a search space for PDCCH based on information indicating that a re-transmission is expected wherein the determined search space is present in a later OFDM symbol than if the information indicates that a re-transmission is not expected. The obtaining of the information indication whether or not a re-transmission is expected may be based on, in the downlink scenario, if the wireless device 121 has transmitted a HARQ-ACK message indicating a Non-Acknowledgement, NACK, due to e.g. a decoding failure, of a previous received data transmission. The configuration of the wireless device 121 to determine a search space based on the information indication whether or not a re-transmission is expected may be that the wireless device 121 is configured to transmit a HARQ-ACK message in the same sub-frame n as the data transmission. In such embodiments, the wireless device 121 may determine for sub-frame n+1 a first search space in second OFDM symbol if the transmitted HARQ-ACK message indicates NACK. Otherwise, if the transmitted HARQ-ACK message indicates ACK, the determined first search space may be in first OFDM symbol of sub-frame n+1.

In some embodiments, the PDCCH region covers multiple OFDM symbols. In such embodiments, the determined first search space in case of NACK may be a sub-set of the search spaces such that the sub-set search space is not located in the first OFDM symbols. In other embodiments, the first search space in case of NACK may be a search space located in OFDM symbols after the PDCCH region. In such embodiments, the wireless device 121 may be configured with a first-transmission PDCCH region and a re-transmission PDCCH region where search spaces on the re-transmission PDCCH region in some embodiments only is determined if the wireless device 121 transmitted a HARQ-ACK indicating NACK.

In some embodiments, where the PDCCH region convers multiple OFDM symbols, there may be a first-transmission search space and re-transmission search space defined on the PDCCH region. If the wireless device 121 transmitted a HARQ-ACK message indicating NACK, the wireless device 121 may attempt to receive a PDCCH in the re-transmission search space, otherwise it only attempts to receive PDCCH in the first-transmission search space.

In some embodiments a re-transmission assignment is using a compact format (fewer bits), for example using a single bit assignment indicating that assignment equals the original assignment, e.g. the wireless device 121 is re-assigned the same time-frequency resources for the re-transmission PDSCH. In such embodiments, the first search space in case of a HARQ-ACK indicating NACK may also be compact.

In some embodiments, the wireless device 121 may also determine a second search space. In such embodiments, the wireless device 121 may only attempt to receive an assignment on the second search space if no assignments were found on the first search space.

PDSCH Start Symbol with Respect to Determined First Search Space

In some embodiments, the wireless device 121 may be configured with a first-transmission PDCCH being present in the first OFDM symbol of the sub-frame and a re-transmission PDCCH being present in the second OFDM symbol. The wireless communications network 100 may operate in TDD mode and the wireless device 121 is configured to transmit HARQ-ACK in same sub-frame as the data transmission. In this scenario the HARQ-ACK is transmitted in the last OFDM symbol of the sub-frame. Due to timing advance and that wireless device 121 needs some time to perform decoding of the data transmission and pre-paring the HARQ-ACK transmission, the PDSCH ends before the last two OFDM symbols of sub-frame. The starting OFDM of the PDSCH is the OFDM symbol after the used PDCCH, hence the starting OFDM symbol for PDSCH depends if the first-transmission PDCCH or the re-transmission PDCCH is used. For example, if the sub-frame comprises 7 OFDM symbols the scheme may look like:

$1^{st}$ OFDM: first-transmission PDCCH
$2^{nd}$ OFDM: PDSCH or re-transmission PDCCH
$3^{rd}$-$5^{th}$ OFDM: PDSCH
$6^{th}$ OFDM: TDD-switch guard+"decoding time"
$7^{th}$ OFDM: PUCCH (HARQ-ACK)

Figure 8:
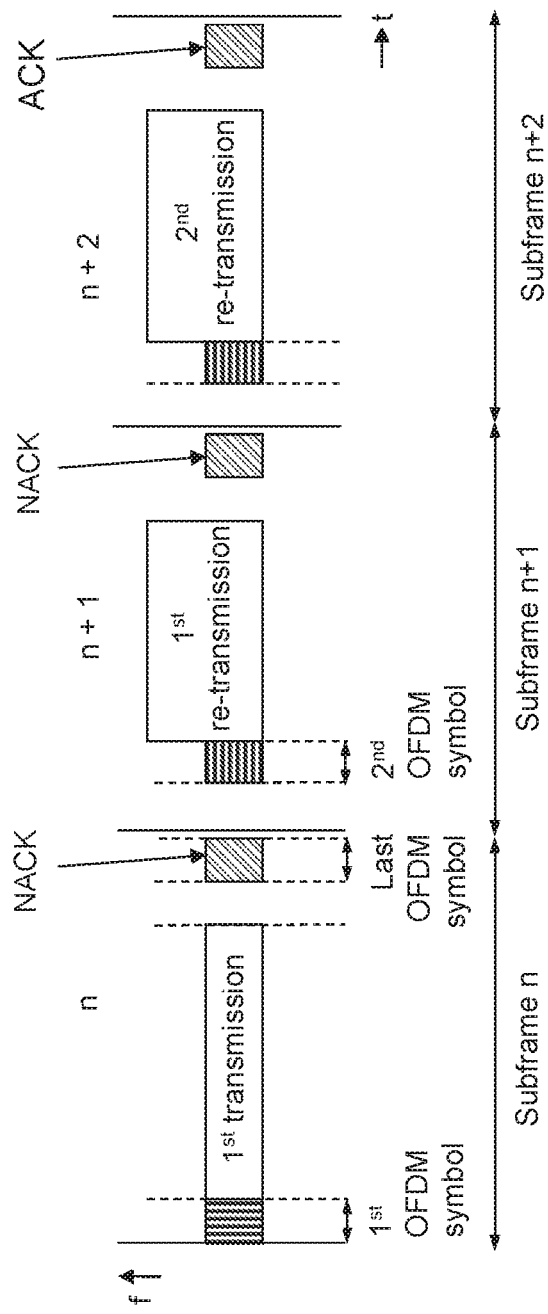
FIG. 8 is a schematic illustration of signalling according to embodiments of a wireless device and a network node.

FIG. 8 illustrates an example of this scheme. Here, the wireless device 121 failed the decoding of the data transmission in sub-frame n. The wireless device 121 therefore transmits a HARQ-ACK message indicating NACK and then it determines, for sub-frame n+1, a first search space in the re-transmission PDCCH region. However, the re-transmission in sub-frame n+1 also failed and the wireless device 121 again transmits a "NACK". The wireless device 121 again determines a first search space in the re-transmission PDCCH region for sub-frame n+2. In this embodiment, the PDSCH covers less OFDM symbols for the re-transmissions than the original transmission. It may therefore in some examples of this embodiment be desirable to increase the re-transmission assignment in frequency domain. This is illustrated in FIG. 8 in that a larger area of resources is denoted for sub-frames n+1 and n+2 for the first and second re-transmission than the area of resources denoted for the first transmission in sub-frame n.

In other words, FIG. 8 illustrates three sub-frames where a first transmission in sub-frame n is re-transmitted in sub-frame n+1 and n+2. The re-transmission PDCCH is used in the "re-transmission" sub-frames.

In some embodiments, there may be more data to wireless device 121 that could be transmitted in the first transmission in sub-frame n. In embodiments where first-transmissions may not use the re-transmission PDCCH or if the wireless device 121 only determine search spaces on the re-transmission PDCCH region if it sends "NACK" the HARQ- ACK may not be present for scheduler when it should perform the assignment of PDCCH resources.

Figure 9:
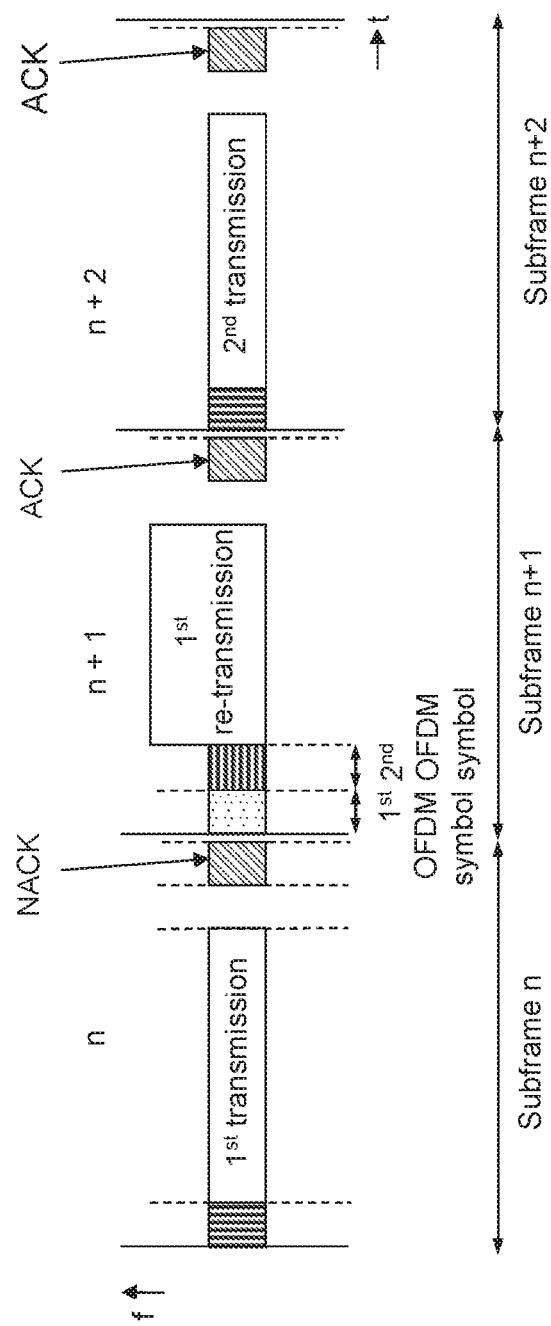
FIG. 9 is another schematic illustration of signalling according to embodiments of a wireless device and a network node.

In such examples of this embodiment the scheduler may assign a "tentative" first-transmission assignment on the first-transmission PDCCH and then revoke the PDSCH transmission if the HARQ-ACK later arrives with a "NACK" and instead assign a re-transmission PDCCH for a re-transmission PDSCH. For example, in case the first-transmission PDCCH covers at least two OFDM-symbols, the scheduler may have time to revoke the PDSCH transmission in the second OFDM symbol. In some such examples the first-transmission PDCCH may be transmitted over air and may be possible for the wireless device 121 to receive. A solution to this problem may be that the wireless device 121 is configured with the rule that a second search space on the first-transmission PDCCH is only determined if no assignment is found using the first search space. This may be advantageous in order to avoid the wireless device missing assignments, e.g. if a NACK is wrongfully determined in the network node as an ACK, a wireless device not searching in the first search space, but only in the second search space, would miss any assignments in the first search space. This is also illustrated in FIG. 9. FIG. 9 illustrates a "tentative" assignment of a first transmission (dotted field) that may be ignored by the wireless device 121 since it found a re-transmission assignment. This means that the tentative assignment may comprise an assignment of a second transmission, which may be ignored by the wireless device 121, and means that the PDSCH for the second transmission is revoked by the scheduler.

Scheduling Transmissions

Embodiments from the schedulers perspective, i.e. from the network node 110, are considered here. Due to strict timing the scheduler may need to perform a scheduling of first-transmissions before knowing if there are re-transmissions that should be made. It is further desirable to avoid scheduling first-transmission PDSCH on same time-frequency resources as re-transmission PDCCH. The scheduler may in such scenarios avoid using all resources for PDSCH when performing scheduling of first transmissions but also leave at least a few "re-transmission" search space entries not being overlapped by first-transmission PDSCH. The assignment "puzzle" to avoid overlapping first-transmission PDSCH and re-transmission PDCCH/PDSCH is illustrated in FIG. 10.

Figure 10:
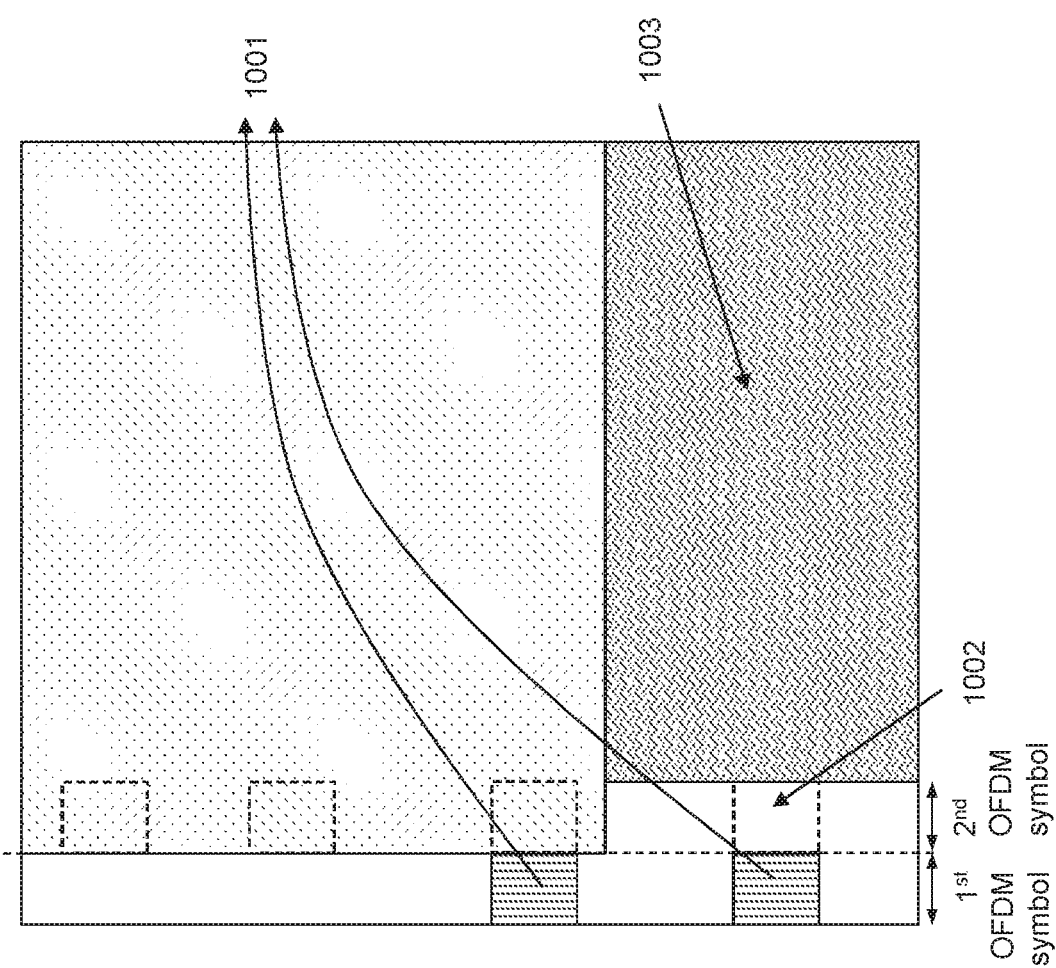
FIG. 10 is a schematic illustration of allocation of transmission resources according to embodiments of a wireless device and a network node.

FIG. 10 illustrates PDSCH resources that a scheduler may leave for re-transmission assignments. It is also illustrated that the scheduler may coordinate such that at least a few search space entries are not overlapped by first-transmission PDSCH. For example, the resource areas indicated by 1001 may be used for assignment of PDSCH for first transmissions avoiding at least one search space entry that may be used for re-transmissions. Thus, the resource area indicated by 1002 may, for example, be used for a search space entry that may be used for re-transmission assignment. This enables, for example, the resource area indicated by 1003 to, for example, be used as a possible PDSCH for re-transmissions.

Uplink Assignments

Figure 11:
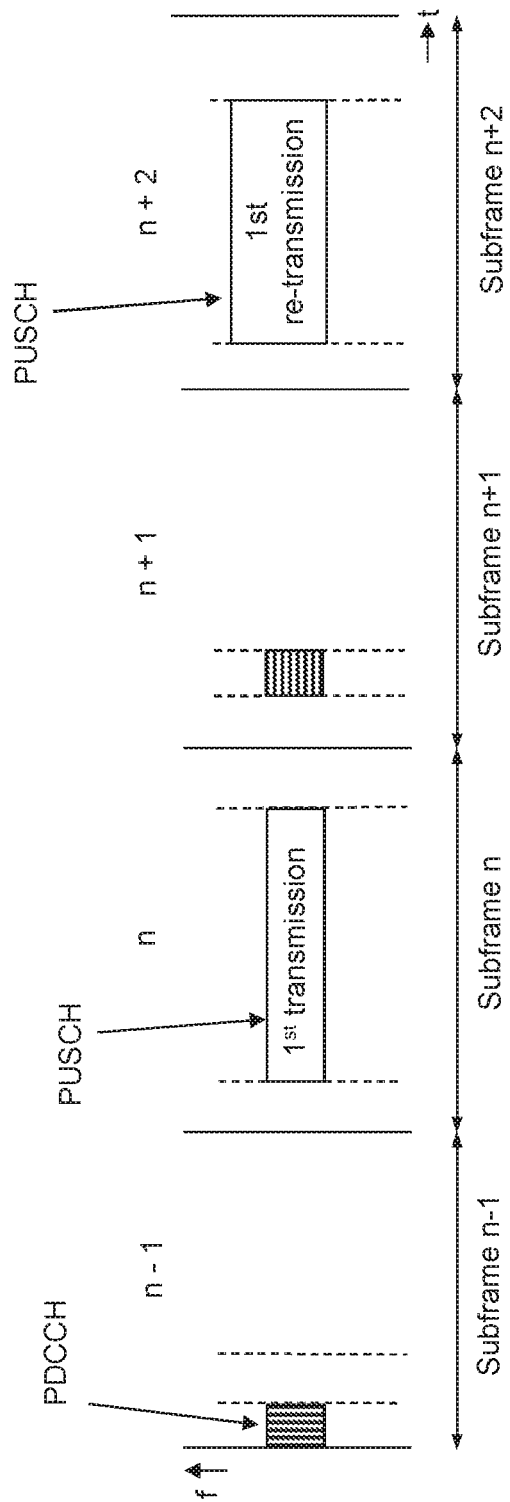
FIG. 11 is a further schematic illustration of signalling according to embodiments of a wireless device and a network node.

FIG. 11 illustrates embodiments where an uplink assignment sent in a sub-frame grants a PUSCH transmission in the consecutive next sub-frame.

In some embodiments, the wireless device 121 is configured with a first-transmission PDCCH being present in the first OFDM symbol of the sub-frame and a re-transmission PDCCH being present in the second OFDM symbol. This embodiment is an uplink embodiment where assignment on PDCCH in sub-frame n−1 grant an uplink PUSCH (Physical Uplink Shared CHannel) transmission in sub-frame n. When the wireless device 121 performed the transmission in sub-frame n it determines first search space on the re-transmission PDCCH in sub-frame n+1 where it attempts to find a re-transmission assignment. Since the network node 110 may successfully receive the transmission from the wireless device 121 and hence determine that a re-transmission is not needed, the wireless device 121 may in some examples of this embodiment also determine a second search space on the first-transmission PDCCH. If the network node 110 fails to decode the transmission in sub-frame n it will schedule the wireless device 121 with a re-transmission assignment transmitted in second OFDM symbol (i.e., on the re-transmission PDCCH).

Figure 13:
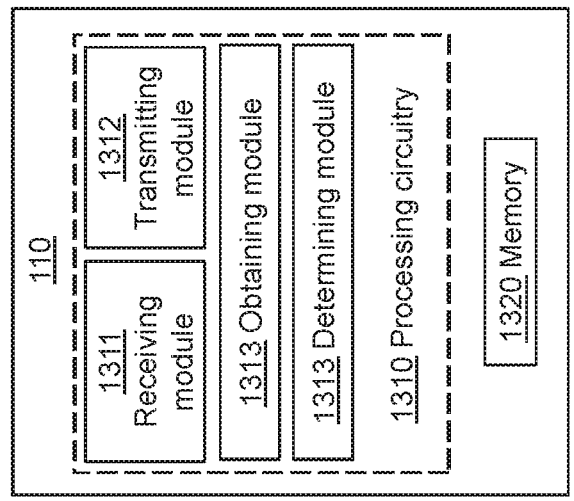
FIG. 13 is a schematic block diagram depicting embodiments of a network node.
Figure 12:
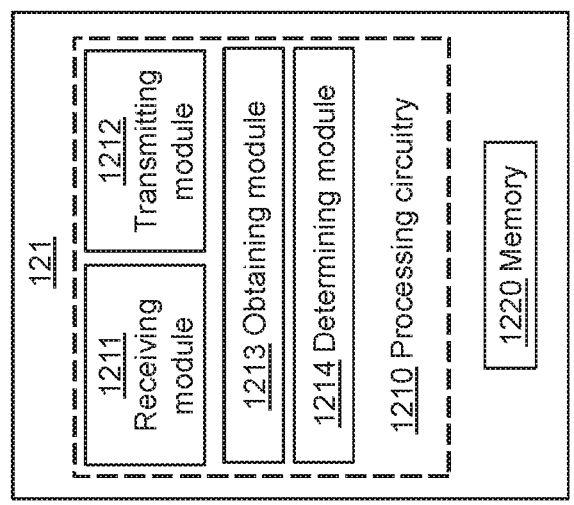
FIG. 12 is a schematic block diagram depicting embodiments of a wireless device.

To perform the method actions herein a communication node in the form of a wireless device 121 and a network node 110 are provided. FIGS. 12-13 are block diagrams depicting the wireless device 121 and the network node 110. The wireless device 121 is configured to perform the methods described for a wireless device 121 according to embodiments herein. The network node 110 is also configured to perform the methods described for a network node 110 according to embodiments herein. It should also be noted that wireless device 121 may, according to some embodiments, also be configured to perform the methods described for a network node 110 according to embodiments herein.

The embodiments herein for handling transmissions in a wireless communications network 100 may be implemented through one or more processors 1210 in the wireless device 121 depicted in FIG. 12, together with computer program code for performing the functions and/or method actions of the embodiments herein. The program code mentioned above may also be provided as a computer program product, for instance in the form of a data carrier carrying computer program code for performing embodiments herein when being loaded into the wireless device 121. One such carrier may be in the form of a CD ROM disc. It is however feasible with other data carriers such as a memory stick. The computer program code may furthermore be provided as pure program code on a server and downloaded to the wireless device 121.

The wireless device 121 comprises a receiving module 1211, or receiver (RX), and a transmitting module 1212, or transmitter (TX), over which the wireless device 121 may transmit/receive signals to other nodes, such as, e.g. the network node 110 or other wireless devices. The receiving and transmitting modules 1211, 1212 may also be incorporated into a single transceiver or communications unit.

Also, the wireless device 121 or the one or more processor 1210 may be configured to, or comprise an obtaining module 1213 configured to, obtain information indicating that a re-transmission of the first transmission is expected in a second subframe n+1 consecutive to the first subframe n. This may also be referred to as the wireless device 121 comprising an obtaining module 1213 for obtaining information indicating that a re-transmission assignment for the first transmission is expected on a physical control channel in a second subframe consecutive to the first subframe according to the embodiments herein.

Further, the wireless device 121 or the one or more processor 1210 may be configured to, or comprise a determining module 1214 configured to, determine a search space in the second subframe n+1 based on the obtained information. This may also be referred to as the wireless device 121 comprising a determining module 1214 for determining a secondary search space for the physical control channel in the second subframe based on the obtained information according to the embodiments herein.

Furthermore, the wireless device 121 or the one or more processor 1210 may be configured to, or comprise the receiving module 1211 configured to, receive a transmission assignment for a retransmission of the first transmission in the second subframe n+1 based on the determined search space according to the embodiments herein.

The wireless device 121 further comprises a memory 1220. The memory 1220 may, for example, be used to store applications or programs to perform the methods herein and/or any information used by such applications or programs.

The embodiments herein for handling transmissions in a wireless communications network 100 may be implemented through one or more processors 1310 in the network node 110 depicted in FIG. 13, together with computer program code for performing the functions and/or method actions of the embodiments herein. The program code mentioned above may also be provided as a computer program product, for instance in the form of a data carrier carrying computer program code for performing embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 comprises a receiving module 1311, or receiver (RX), and a transmitting module 1312, or transmitter (TX), over which the network node 110 may transmit/receive signals to other nodes, such as, e.g. the wireless device 121 or other wireless devices or network nodes. The receiving and transmitting modules 1311, 1312 may also be incorporated into a single transceiver or communications unit.

Also, the network node 110 or the one or more processor 1310 may be configured to, or comprise an obtaining module 1313 configured to, obtain information indicating that decoding of the first transmission in the first subframe n has failed. This may also be referred to as the network node 110 comprising an obtaining module 1313 for obtaining information indicating that decoding of the first transmission in the first subframe has failed according to the embodiments herein.

Further, the network node 110 or the one or more processor 1310 may be configured to, or comprise a determining module 1314 configured to, determine a search space in a second subframe n+1 consecutive to the first subframe n based on the obtained information. This may also be referred to as the network node 110 comprising a determining module 1314 for determining a secondary search space for the physical control channel in a second subframe consecutive to the first subframe based on the obtained information according to the embodiments herein.

Furthermore, the network node 110 or the one or more processor 1310 may be configured to, or comprise the receiving module 1311 configured to, transmit, to the wireless device 121, a transmission assignment for a retransmission of the first transmission in the second subframe n+1 based on the determined search space.

The network node 110 further comprises a memory 1320. The memory 1320 may, for example, be used to store applications or programs to perform the methods herein and/or any information used by such applications or programs. The network node 110 may further comprise an input/output interface (not shown), which may be used to communicate over a wired connection with other radio network entities or nodes (not shown) in the wireless communications network 100.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of processing circuits discussed may be provided through the use of dedicated hardware, while others are provided with hardware for executing software, in association with the appropriate software or firmware. Thus, the term "processor" or "controller" as may be used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices. The different actions taken by the different nodes may be implemented with different circuits.

From the above it may be seen that the embodiments may further comprise a computer program product, comprising instructions which, when executed on at least one processor, e.g. the processors 1210, 1310, cause the at least one processor to carry out the method for handling transmissions in the wireless communications network 100. Also, some embodiments may, as described above, further comprise a carrier containing said computer program, wherein the carrier is one of an electronic signal, optical signal, radio signal, or computer readable storage medium.

Further Example Embodiments

According to some aspects, a method performed by a wireless device 121 for handling transmissions in a wireless communications network 100, wherein a first transmission is communicated to or from the wireless device 121 in a first subframe (n), is provided. The latter may also be described as a first transmission that is assigned to the wireless device 121 for execution in a first subframe (n), wherein the execution may refer to a transmission or reception of the first transmission. The method may comprise obtaining information indicating that a re-transmission assignment for the first transmission is expected on a physical control channel in a second subframe (n+1) consecutive to the first subframe (n). The method may also comprise determining a secondary search space for the physical control channel in the second subframe (n+1) based on the obtained information. The method may further comprise receiving a re-transmission assignment for the first transmission in the second subframe (n+1) based on the determined secondary search space, e.g. within the determined secondary search space.

According to some aspects, the secondary search space for the physical control channel in the second subframe (n+1) is different from a primary search space determined for the physical control channel in the second subframe (n+1).

According to some aspects, the method may further comprise receiving a re-transmission of the first transmission in the second subframe (n+1) based on the received re-transmission assignment, e.g. in accordance with the received re-transmission assignment. In this case, according to some aspects, obtaining the information indicating that a re-transmission assignment is expected may comprise determining that the decoding of the first transmission in the first subframe (n) failed. According to some aspects, the decoding of the first transmission in the first subframe (n) may be determined to have failed in case a Hybrid Automatic Repeat request, HARQ, Non-Acknowledgement message, NACK, for the first transmission is sent by the wireless device 121. According to some aspects, the HARQ-NACK message may be sent by the wireless device 121 in the first subframe (n), such as, for example, in the last symbol of the first subframe (n).

According to some aspects, the method may further comprise transmitting a re-transmission of the first transmission in a third subframe (n+2) consecutive or subsequent to the second subframe (n+1) based on the received re-transmission assignment. In this case, according to some aspects, obtaining the information indicating that a re-transmission assignment is expected may comprise determining that the first transmission in the first subframe (n) is a transmission sent from the wireless device 121, e.g. an uplink transmission on the Physical Uplink Shared Channel, PUSCH.

According to some aspects, the secondary search space may be determined to use one or more symbols in the second subframe (n+1) that are different from one or more symbols in the second subframe (n+1) used by a primary search space. In this case, according to some aspects, the primary search space may use at least the first symbol in the second subframe (n+1), and the secondary search space may use one or more symbols in the second subframe (n+1) consecutive and/or subsequent to the at least first symbol in the second subframe (n+1) used by the primary search space.

According to some aspects, the re-transmission assignment for the first transmission in the second subframe (n+1) may have less number of bits than the original transmission assignment for the first transmission in the first subframe (n). In this case, according to some aspects, the re-transmission assignment may be a single bit assignment indicating that the re-transmission assignment for the first transmission in the second subframe (n+1) equals the original transmission assignment for the first transmission in the first subframe (n).

According to some aspects, the re-transmission assignment for the first transmission in the second subframe (n+1) indicates a transmission resource allocation for the re-transmission of the first transmission in the second subframe (n+1) that is larger in the frequency domain than the transmission resource allocation indicated in a transmission assignment for the first transmission in the first subframe (n).

According to some aspects, the method may further comprise ignoring a transmission assignment for a second transmission found in a determined primary search space in the second subframe (n+1) when a re-transmission assignment for the first transmission is found in the determined secondary search space in the second subframe (n+1).

According to some aspects, the method may further comprise obtaining information indicating that a re-transmission assignment for the first transmission is not expected on the physical control channel in the second subframe (n+1); determining a primary search space for the physical control channel in the second subframe (n+1) based on the obtained information; receiving a transmission assignment for a second transmission in the second subframe (n+1) based on a determined primary search space. In this case, according to some aspects, the method may further comprise receiving the second transmission in the second subframe (n+1) based on the received transmission assignment for the second transmission, or transmitting the second transmission in a third subframe (n+2) consecutive or subsequent to the second subframe (n+1) based on the received transmission assignment.

Also, according to some aspects, obtaining the information indicating that a re-transmission assignment is expected may comprise determining that the decoding of the first transmission in the first subframe (n) was successful. Further, according to some aspects, the decoding of the first transmission in the first subframe (n) may be determined to be successful in case a HARQ Acknowledgement message, ACK, for the first transmission is sent by wireless device 121.

According to some aspects, the physical control channel may be a Physical Downlink Control Channel, PDCCH, or an enhanced PDCCH, ePDCCH.

According to some aspects, a method performed by a network node 110 for handling transmissions in a wireless communications network 100, wherein a first transmission is communicated to or from a wireless device 121 in a first subframe (n) is provided. The method may comprise obtaining information indicating that decoding of the first transmission in the first subframe (n) has failed. The method may also comprise determining a secondary search space for the physical control channel in a second subframe (n+1) consecutive to the first subframe (n) based on the obtained information. Further, the method may comprise transmitting, to the wireless device 121, a re-transmission assignment for the first transmission in the second subframe (n+1) within the determined secondary search space.

According to some aspects, the secondary search space for the physical control channel in the second subframe (n+1) may be different from a primary search space determined for the physical control channel in the second subframe (n+1).

According to some aspects, the information indicating that the decoding of the first transmission in the first subframe (n) has failed may be a HARQ NACK message received from the wireless device 121 and the method may further comprise transmitting, to the wireless device 121, a re-transmission of the first transmission in the second subframe (n+1) based on the transmitted re-transmission assignment. Optionally, according to some aspects, the information indicating that the decoding of the first transmission in the first subframe (n) may be determined by the network node 110 and the method may further comprise receiving, from the wireless device 121, a re-transmission of the first transmission in a third subframe (n+2) consecutive or subsequent to the second subframe (n+1) based on the transmitted re-transmission assignment.

According to some aspects, the method may further comprise obtaining information indicating a successful decoding of the first transmission in the first subframe (n); determining a primary search space for the physical control channel in a second subframe (n+1) based on the obtained information; transmitting, to the wireless device 121, a transmission assignment for the second transmission in the second subframe (n+1) based on the determined primary search space; and transmitting the second transmission in the second subframe (n+1) based on the transmitted transmission assignment for the second transmission, or receiving the second transmission in a third subframe (n+2) consecutive or subsequent to the second subframe (n+1) based on the transmitted transmission assignment for the second transmission.

Further, according to some aspects, the method may further comprise, in case the transmitting of the transmission assignment for the second transmission is performed prior to obtaining the information indicating that the decoding of the first transmission has failed, skipping the transmission of the second transmission in the second subframe (n+1) and instead determining the secondary search space, transmitting the re-transmission assignment for the first transmission in the second subframe (n+1) and transmitting re-transmission of the first transmission in the second subframe (n+1) based on the transmitted re-transmission assignment.

The terminology used in the detailed description of the particular embodiments illustrated in the accompanying drawings is not intended to be limiting of the described network node, wireless device or methods herein.

As used herein, the term "and/or" comprises any and all combinations of one or more of the associated listed items. Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

Abbreviations

3GPP Third Generation Partnership Project
eNB Enhanced NodeB
CQI Channel-Quality Indicator
CRS Cell-Specific Reference Symbol
CSI Channel-State Information
CSI-IM CSI Interference Measurement
CSI-RS CSI Reference Symbol
DCI Downlink Control Information
HARQ Hybrid Automatic Repeat-reQuest
LTE Long Term Evolution
MAC Medium Access Control
MCS Modulation and Coding Scheme
MI Mutual Information
MIMO Multiple Input Multiple Output
NDI New Data Indicator
(e)PDCCH (enhanced) Physical Downlink Control Channel
PDU Protocol Data Unit
PMI Pre-coding Matrix Indicator
PRB Physical Resource Block
RI Rank Indicator
RV Redundancy Version
RRC Radio Resource Control
TM Transmission Mode
TTI Transmission Time Interval
UE User Equipment

The invention claimed is:

1. A method performed by a wireless device configured for operation in a wireless communications network, the method comprising:
   receiving a scheduled downlink transmission in a first subframe, the scheduled downlink transmission transmitted by a radio network node of the wireless communications network;
   monitoring a first search space for a new transmission assignment, responsive to successful decoding of the scheduled downlink transmission, the first search space positioned at a beginning of a second subframe that is consecutive to the first subframe; and
   monitoring a second search space for a retransmission assignment, responsive to unsuccessful decoding of the scheduled downlink transmission, the second search space positioned later in the second subframe.

2. The method according to claim 1, wherein the wireless device receives and decodes the scheduled downlink transmission during the first subframe and returns a positive or negative acknowledgment to the radio network node in the first subframe, in dependence on whether the wireless device successfully decodes the scheduled downlink transmission.

3. The method according to claim 1, wherein the retransmission assignment comprises fewer bits than the new transmission assignment.

4. The method according to claim 1, wherein the retransmission assignment comprises a single-bit indicator indicating that the retransmission assignment equals an assignment used for the scheduled downlink transmission in the first subframe.

5. The method according to claim 1, wherein the retransmission assignment provides a larger resource allocation in the frequency domain than was provided by a transmission assignment corresponding to the scheduled downlink transmission in the first subframe.

6. The method according to claim 1, further comprising, in a case where the second subframe includes the new transmission assignment in the first search space and the retransmission assignment in the second search space, ignoring the new transmission assignment and responding to the retransmission assignment.

7. A wireless device configured for operation in a wireless communications network, the wireless device comprising:
   transceiver circuitry configured for communicating with a radio network node of the wireless communication network; and processing circuitry operatively associated with the transceiver circuitry and configured to:
receive a scheduled downlink transmission in a first subframe, the scheduled downlink transmission transmitted by the radio network node;
monitor a first search space for a new transmission assignment, responsive to successful decoding of the scheduled downlink transmission, the first search space positioned at a beginning of a second subframe that is consecutive to the first subframe; and
monitor a second search space for a retransmission assignment, responsive to unsuccessful decoding of the scheduled downlink transmission, the second search space positioned later in the second subframe.

8. The wireless device according to claim 7, wherein the processing circuitry is configured to receive and decode the scheduled downlink transmission during the first subframe and return a positive or negative acknowledgment to the radio network node in the first subframe, in dependence on whether the wireless device successfully decodes the scheduled downlink transmission.

9. The wireless device according to claim 7, wherein the retransmission assignment comprises fewer bits than the new transmission assignment.

10. The wireless device according to claim 9, wherein the retransmission assignment comprises single-bit indicator indicating that the retransmission assignment equals an assignment used for the scheduled downlink transmission in the first subframe.

11. The wireless device according to claim 7, wherein the retransmission assignment provides a larger resource allocation in the frequency domain than was provided by a transmission assignment corresponding to the scheduled downlink transmission in the first subframe.

12. The wireless device according to claim 7, wherein, in a case where the second subframe includes the new transmission assignment in the first search space and the retransmission assignment in the second search space, the processing circuitry is configured to ignore the new transmission assignment and respond to the retransmission assignment.

13. A method performed by a radio network node configured for operation Previously presented in a wireless communications network, the method comprising:
performing a scheduled downlink transmission in a first subframe, for a wireless device;
receiving an acknowledgment from the wireless device in the first subframe, indicating a positive or negative acknowledgment by the wireless device of the scheduled downlink transmission; and
responsive to the acknowledgment being the negative acknowledgement, transmitting a retransmission assignment for the wireless device in a second search space of a second subframe that is consecutive to the first subframe, the second search space positioned in the second subframe later in time than a first search space that is positioned at a beginning of the second subframe for use by the radio network node for sending new transmission assignments.

14. The method according to claim 13, wherein the retransmission assignment uses fewer bits than used for new transmission assignments.

15. The method according to claim 13, wherein the retransmission assignment comprises a single-bit indicator, indicating that the retransmission assignment equals a transmission assignment associated with the scheduled downlink transmission.

16. The method according to claim 13, wherein a time for sending a new transmission assignment for the wireless device occurs before the radio network node determines whether the scheduled downlink transmission was successful and wherein the method includes, in a case where the scheduled downlink transmission was not successful, the radio network node sending both the new transmission assignment and the retransmission assignment but performing a retransmission corresponding to the retransmission assignment and not performing a new transmission corresponding to the new transmission assignment.

17. A radio network node configured for operation in a wireless communications network, the radio network node comprising:
transceiver circuitry configured for communicating with a wireless device; and
processing circuitry operatively associated with the transceiver circuitry and configured to:
perform a scheduled downlink transmission in a first subframe, for the wireless device;
receive an acknowledgment from the wireless device in the first subframe, indicating a positive or negative acknowledgment by the wireless device of the scheduled downlink transmission; and
responsive to the acknowledgment being the negative acknowledgement, transmit a retransmission assignment for the wireless device in a second search space of a second subframe that is consecutive to the first subframe, the second search space positioned in the second subframe later in time than a first search space that is positioned at a beginning of the second subframe and used by the radio network node for sending new transmission assignments.

18. The radio network node according to claim 17, wherein the retransmission assignment uses fewer bits than used for new transmission assignments.

19. The radio network node according to claim 17, wherein the retransmission assignment comprises a single-bit indicator, indicating that the retransmission assignment equals a transmission assignment associated with the scheduled downlink transmission.

20. The radio network node according to claim 17, wherein a time for sending a new transmission assignment for the wireless device occurs before the radio network node determines whether the scheduled transmission was successful and, in a case where the scheduled downlink transmission was not successful, the processing circuitry of the radio network node is configured to send both the new transmission assignment and the retransmission assignment but perform a retransmission corresponding to the retransmission assignment and not perform a new transmission corresponding to the new transmission assignment.

* * * * *